(12) United States Patent
Wittmann et al.

(10) Patent No.: US 7,830,076 B2
(45) Date of Patent: Nov. 9, 2010

(54) INCANDESCENT HALOGEN LAMP

(75) Inventors: Klaus Wittmann, Sontheim (DE);
Sascha Zelt, Ulm (DE)

(73) Assignee: Patent-Treuhand-Gesellschaft fur elektrische Gluhlampen mbH, Munich (DE)

( * ) Notice: Subject to any disclaimer, the term of this patent is extended or adjusted under 35 U.S.C. 154(b) by 406 days.

(21) Appl. No.: 11/885,004

(22) PCT Filed: Sep. 9, 2006

(86) PCT No.: PCT/DE2006/000223

§ 371 (c)(1),
(2), (4) Date: Sep. 7, 2007

(87) PCT Pub. No.: WO2006/097058

PCT Pub. Date: Sep. 21, 2006

(65) Prior Publication Data

US 2008/0164813 A1    Jul. 10, 2008

(30) Foreign Application Priority Data

Mar. 16, 2005  (DE)  ........................ 10 2005 012 487

(51) Int. Cl.
*H01K 1/50* (2006.01)
*H01J 61/16* (2006.01)

(52) U.S. Cl. ........................ 313/379; 313/370; 313/643

(58) Field of Classification Search ................. 313/579, 313/643, 570
See application file for complete search history.

(56) References Cited

U.S. PATENT DOCUMENTS

| 4,020,380 | A | | 4/1977 | Kulkarni et al. | |
|---|---|---|---|---|---|
| 4,480,212 | A | * | 10/1984 | Monahan et al. | 315/71 |
| 4,524,302 | A | * | 6/1985 | Berlec | 313/579 |
| 4,748,376 | A | * | 5/1988 | Weld et al. | 313/579 |
| 5,034,656 | A | * | 7/1991 | Yu et al. | 313/579 |
| 5,670,840 | A | * | 9/1997 | Lanese et al. | 313/25 |
| 6,611,102 | B2 | * | 8/2003 | Kimoto et al. | 313/637 |
| 6,750,613 | B2 | * | 6/2004 | Myojo et al. | 313/634 |
| 2001/0028221 | A1 | | 10/2001 | Kimoto et al. | |
| 2002/0163303 | A1 | | 11/2002 | Bunk et al. | |
| 2005/0127836 | A1 | * | 6/2005 | Plumeyer et al. | 313/580 |

FOREIGN PATENT DOCUMENTS

| EP | 0 370 318 A | 5/1990 |
|---|---|---|
| EP | 1 134 787 A | 9/2001 |
| EP | 1 255 279 A | 11/2002 |

\* cited by examiner

*Primary Examiner*—Nimeshkumar D Patel
*Assistant Examiner*—Jacob Stern
(74) *Attorney, Agent, or Firm*—Holtz, Holtz, Goodman & Chick, P.C.

(57) ABSTRACT

The invention relates to an incandescent halogen lamp, comprising at least one tungsten incandescent filament (3) in a transparent light bulb (1) and a filling in the light bulb (1), which has a halogen component for a halogen recycling process and a noble gas component containing krypton or xenon, whereby the noble gas component comprises at least one further noble gas, the atoms of which have a smaller atomic radius than krypton atoms and the cold filling pressure within the light bulb (1) is greater than or equal to 0.7 Megapascal. Said incandescent halogen lamp is suitable as light source in a curved lamp or as combined day running or position light in a motor vehicle.

5 Claims, 1 Drawing Sheet

INCANDESCENT HALOGEN LAMP

Figure 1:
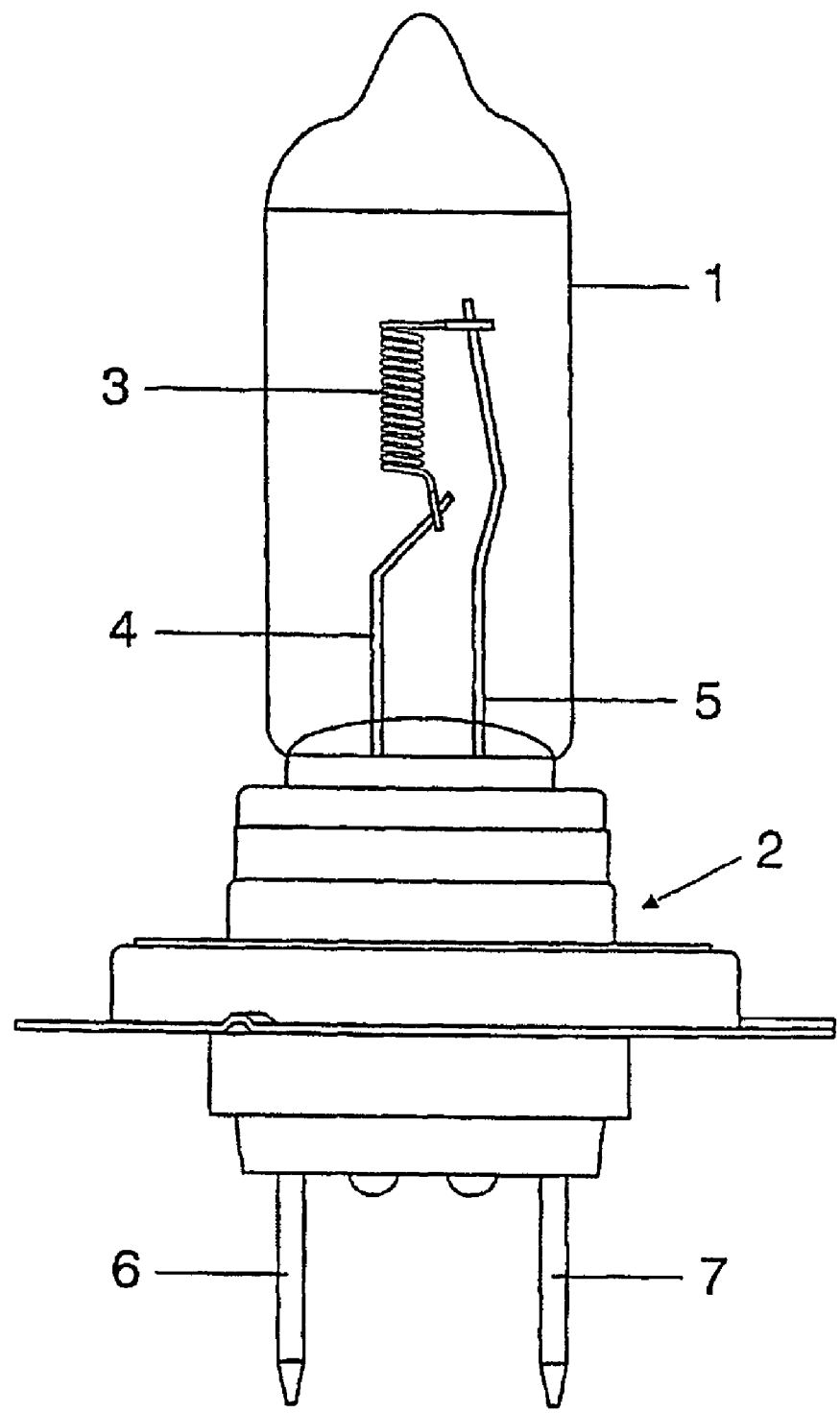

The invention relates to a halogen incandescent lamp in accordance with the precharacterizing clause of patent claim 1.

I. PRIOR ART

Such a halogen incandescent lamp is disclosed, for example, in EP 0 370 318 A2. This document describes a halogen incandescent lamp for operation at high temperatures which has a transparent lamp vessel and a tungsten incandescent filament arranged therein as well as a filling arranged within the lamp vessel, the filling comprising a mixture of carbon, hydrogen, inert gas, phosphorus, chlorine and bromine. The molar ratio of the combined total amount of chlorine and bromine to carbon is greater than 1, and the molar ratio of the phosphorus to the combined total amount of chlorine and bromine is in the range of from 0.5 to 2. The gases nitrogen, xenon, krypton, argon or helium are proposed as the inert gas.

EP 1 255 279 A2 describes a miniature halogen incandescent lamp, whose filling has a coldfilling pressure in the range of from 0.5 megapascal to 3 megapascals and whose noble gas component comprises xenon, in order to keep the tungsten evaporation rate of the tungsten incandescent filament as low as possible. The use of the noble gas xenon as a filling component is cost-intensive in lamp vessels having large volumes.

II. DESCRIPTION OF THE INVENTION

The object of the invention is to provide a generic halogen incandescent lamp which can be operated at different powers without notable blackening of the lamp vessel occurring over its life.

This object is achieved according to the invention by the features of patent claim 1. Particularly advantageous embodiments of the invention are described in the dependent patent claims.

The halogen incandescent lamp according to the invention has at least one tungsten incandescent filament, which is arranged within a transparent lamp vessel, and a filling in the lamp vessel, the filling comprising a halogen component for a halogen cycle process and a noble gas component. According to the invention, the coldfilling pressure within the lamp vessel is greater than or equal to 0.7 megapascal, and the noble gas component comprises krypton or xenon and at least one further noble gas, whose atoms have a smaller atom radius than krypton atoms.

This ensures that the halogen incandescent lamp can be operated at different powers without notable blackening of the lamp vessel. The high coldfilling pressure in combination with the noble gas krypton or xenon contribute to a low tungsten evaporation rate of the tungsten incandescent filament. In addition to the krypton or xenon, the noble gas component comprises a further noble gas, whose atoms have a smaller atom radius than krypton atoms. It has been shown that, owing to this further noble gas, the transport of heat from the at least one tungsten incandescent filament to the lamp vessel is improved. As a result, sufficient heating of the lamp vessel even during dimming operation of the lamp or during operation with a reduced power and given only a short operating duration of the lamp is ensured in order to maintain the halogen cycle process during the abovementioned operating states or operating phases and to avoid blackening of the lamp vessel.

The halogen incandescent lamp according to the invention is therefore particularly well suited to use as a light source in a static cornering light, which is switched on in the vehicle headlamp for only a short period of time, for illuminating the side street when turning off, when traveling slowly around a bend or as a parking aid. In addition, the halogen incandescent lamp according to the invention is also suitable for combined use as a daytime running light lamp and as a position light lamp. During the day, this halogen incandescent lamp is operated using the vehicle electrical system voltage of the motor vehicle of, for example, 12 volts as a daytime running light lamp and at night is operated with approximately half the vehicle electrical system voltage of approximately 6 volts as a position light lamp.

Preferably, no xenon but only krypton and a further noble gas neon or argon are used. Both neon and argon contribute to an improvement in the heat transport in the abovementioned sense. In accordance with a first preferred exemplary embodiment of the invention, argon is used as the further noble gas in addition to krypton, the partial pressure of the noble gas argon preferably being less than or equal to 80 percent of the coldfilling pressure in the lamp vessel. In accordance with a second preferred exemplary embodiment of the invention, neon is used as the further noble gas in addition to krypton, the partial pressure of the noble gas neon preferably being less than or equal to 40 percent of the coldfilling pressure in the lamp vessel. In accordance with a third preferred exemplary embodiment of the invention, both neon and argon are used as further noble gases in addition to krypton.

The partial pressure of the noble gas krypton or xenon is advantageously greater than or equal to 20 percent of the coldfilling pressure in order to keep the tungsten evaporation rate of the at least one tungsten incandescent filament low.

The content of the halogen atoms in the filling is advantageously in the range of from 100 ppm (parts per million) to 600 ppm in order to make a halogen cycle process possible. An excessively high concentration or excessive addition of the halogen component may cause the formation of a layer on the lamp vessel or the removal of material at relatively cold metal points.

In order to eliminate contaminations within the lamp vessel which have been passed to the lamp vessel for example during manufacture of the lamp, phosphorus or a phosphorus compound is advantageously arranged as getter within the lamp vessel.

The lamp vessel may be provided with a coating which absorbs some of the electromagnetic radiation generated by the at least one tungsten incandescent filament or reflects it back into the lamp vessel in order to continue to heat up the lamp vessel during operation. This coating is, for example, a transparent interference filter on the outer surface of the lamp vessel which reflects the infrared radiation emitted by the tungsten incandescent filament back into the lamp vessel and ensures additional heating of the lamp. Instead, however, the coating may also be in the form of a transparent layer of accumulated heat which absorbs the infrared radiation and in this way contributes to heating of the lamp vessel. For this purpose, the lamp vessel may have, for example, a suitable coloring.

III. DESCRIPTION OF THE PREFERRED EXEMPLARY EMBODIMENTS

The invention will be explained in more detail below with reference to two preferred exemplary embodiments.

The FIGURE shows a schematic illustration of the construction of the halogen incandescent lamps in accordance with the preferred exemplary embodiments. These halogen incandescent lamps are so-called H8 lamps, which are intended for operation on a rated voltage of 12 volts in a motor vehicle. The maximum power consumption of these lamps is only 43 watts at an operating voltage of 13.2 volts.

In accordance with the preferred exemplary embodiments, the halogen incandescent lamps have a vitreous, substantially cylindrical lamp vessel 1, which is provided at one end with a base 2. An axially aligned incandescent filament 3, whose outgoing filaments, which are enveloped by a molybdenum tube, are each welded to a power supply wire 4, 5, is arranged within the lamp vessel 1. The two power supply wires 4, 5 are each electrically conductively connected to an electrical connection 6, 7 of the base 2. The lamp vessel 1 consists of quartz glass or a hard glass, for example aluminosilicate glass.

A filling is arranged within the lamp vessel 1 which has a halogen component and a noble gas component. In addition, a phosphorus getter is arranged within the lamp vessel 1 in all exemplary embodiments.

In accordance with the first exemplary embodiment of the invention, the noble gas component comprises the noble gases krypton and argon. The total coldfilling pressure, i.e. the total filling pressure at room temperature (approximately 22° C.), is 1.2 megapascal. The partial pressure of the argon is 0.9 megapascal. The content of the halogen atoms in the filling, preferably bromium, iodine and chlorine, is 450 ppm. The rest of the filling is krypton.

In accordance with the second exemplary embodiment of the invention, the noble gas component comprises the noble gases krypton and neon. The total coldfilling pressure, i.e. the total filling pressure at room temperature (approximately 22° C.) is 1.2 megapascal. The partial pressure of the neon is 0.3 megapascal. The content of the halogen atoms in the filling, preferably bromium, iodine and chlorine, is 450 ppm. The rest of the filling is krypton.

In accordance with the third exemplary embodiment of the invention, the noble gas component comprises the noble gases krypton, neon and argon. The total coldfilling pressure is 1.2 megapascal. The partial pressure of krypton and neon is in each case 0.3 megapascal. The content of the halogen atoms in the filling, preferably bromium, iodine and chlorine, is 450 ppm. The rest of the filling is argon.

The invention is not restricted to the exemplary embodiments explained in more detail above. For example, the coldfilling pressure may also have considerably higher values. In addition, instead of the noble gas krypton, in the exemplary embodiments explained above xenon or a mixture of xenon and krypton may also be used.

The invention claimed is:

1. A halogen incandescent lamp having at least one tungsten incandescent filament, which is arranged within a transparent lamp vessel, and a filling in the lamp vessel which comprises a halogen component for a halogen cycle process and a krypton-containing or xenon-containing noble gas component, the coldfilling pressure within the lamp vessel being greater than or equal to 0.7 megapascal, and the partial pressure of krypton or xenon being greater than or equal to 20 percent of the coldfilling pressure, wherein the noble gas component comprises at least one further noble gas, whose atoms have a smaller atom radius than krypton atoms, the further noble gas being argon, and the partial pressure of argon being less than or equal to 80 percent of the coldfilling pressure.

2. The halogen incandescent lamp as claimed in claim 1, wherein the noble gas component further contains neon.

3. The halogen incandescent lamp as claimed in claim 1, wherein the content of the halogen atoms in the filling is in the range of from 100 ppm to 600 ppm.

4. The halogen incandescent lamp as claimed in claim 1, wherein phosphorus or a phosphorus compound is arranged as a getter within the lamp vessel.

5. The halogen incandescent lamp as claimed in claim 1, wherein the lamp vessel is provided with a coating which absorbs some of the electromagnetic radiation generated by the at least one tungsten incandescent filament or reflects it back into the lamp vessel.

\* \* \* \* \*

UNITED STATES PATENT AND TRADEMARK OFFICE
CERTIFICATE OF CORRECTION

| | | |
|---|---|---|
| PATENT NO. | : 7,830,076 B2 | Page 1 of 1 |
| APPLICATION NO. | : 11/885004 | |
| DATED | : November 9, 2010 | |
| INVENTOR(S) | : Wittmann et al. | |

It is certified that error appears in the above-identified patent and that said Letters Patent is hereby corrected as shown below:

On the title page:

Item (22) PCT Filed:

change "Sep. 9, 2006" to --Feb. 9, 2006--.

Signed and Sealed this
Third Day of May, 2011

David J. Kappos
*Director of the United States Patent and Trademark Office*